United States Patent [19]

Pinson

[11] Patent Number: 4,886,562
[45] Date of Patent: Dec. 12, 1989

[54] METHOD OF MANUFACTURING REINFORCED OPTICAL FIBER

[75] Inventor: George T. Pinson, Huntsville, Ala.

[73] Assignee: The Boeing Company, Wichita, Kans.

[21] Appl. No.: 32,242

[22] Filed: Mar. 31, 1987

[51] Int. Cl.⁴ .............................. G02B 6/22; G02B 6/16
[52] U.S. Cl. ............................ 156/172; 118/DIG. 18; 118/DIG. 19; 118/DIG. 22; 156/169; 156/296; 264/1.5; 350/96.23; 427/163
[58] Field of Search ............... 156/180, 441, 296, 148, 156/172, 169; 264/1.5; 57/7; 350/46.23; 427/163, 434.6, 434.7; 118/DIG. 18, DIG. 19, 429, DIG. 22; 174/121 R

[56] References Cited

U.S. PATENT DOCUMENTS

| | | |
|---|---|---|
| 2,504,845 | 4/1950 | Keyes ................................ 174/121 R |
| 2,992,517 | 3/1961 | Hicks, Jr. . |
| 3,748,016 | 7/1973 | Rossire . |
| 4,076,378 | 2/1978 | Cole . |
| 4,365,865 | 12/1982 | Stiles ................................ 350/96.23 |
| 4,441,787 | 4/1984 | Lichtenberger ...................... 57/7 X |
| 4,514,036 | 4/1985 | McDonald ........................ 350/96.23 |
| 4,529,426 | 7/1985 | Pleibel et al. . |
| 4,600,268 | 7/1986 | Spicer ............................... 350/96.23 |
| 4,629,286 | 12/1986 | Fuse et al. . |
| 4,690,503 | 9/1987 | Janssen et al. ................... 427/163 X |

Primary Examiner—Michael W. Ball
Assistant Examiner—Jeff H. Aftergut
Attorney, Agent, or Firm—Finnegan, Henderson, Farabow, Garrett & Dunner

[57] ABSTRACT

A method of manufacturing reinforced optical fiber including conveying optical fiber from a source; symmetrically, coaxially winding reinforcing fiber to a selected density per unit length around the optical fiber; forming an resin matrix among the reinforcing fibers; and coating the resin matrix with an external coating. Reinforcing a predetermined length of an elongated optical fiber comprises gradually reducing the thickness of the external coating and then gradually reducing the density of reinforcing fiber and the thickness of the resin matrix to form a transition from a reinforced fiber and a non-reinforced fiber.

16 Claims, 1 Drawing Sheet

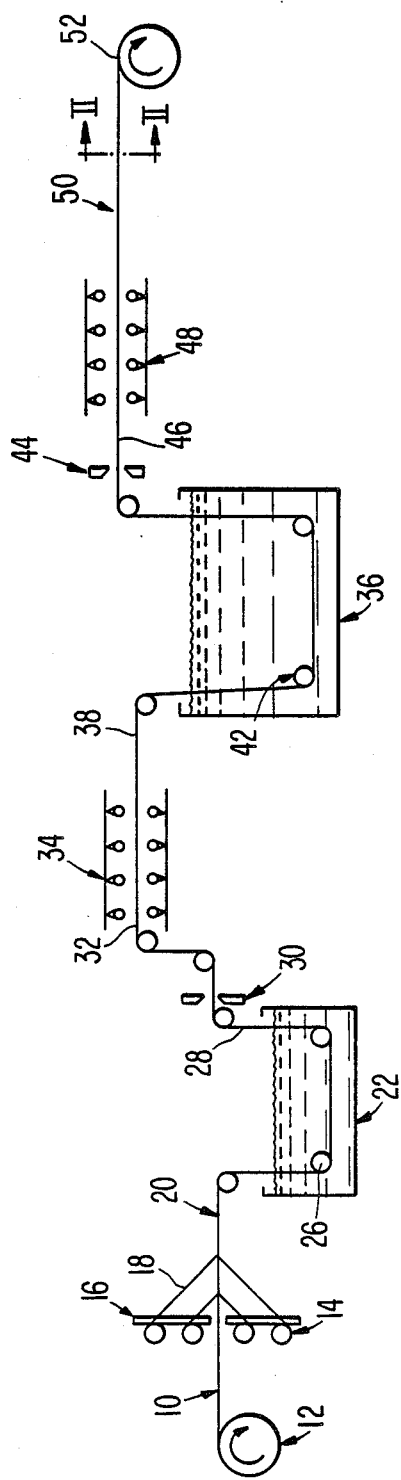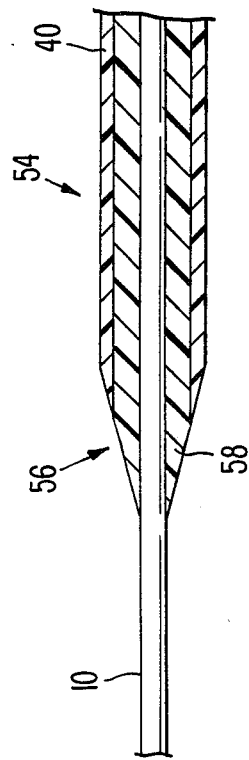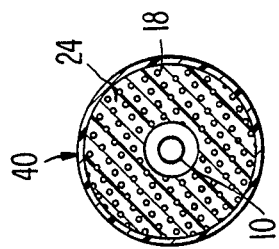

METHOD OF MANUFACTURING REINFORCED OPTICAL FIBER

BACKGROUND OF THE INVENTION

1. Field of the Invention

This invention relates to a method of manufacturing reinforced optical fiber, and, in particular, to a method for manufacturing optical fiber having a predetermined length thereof covered with a reinforcing coating.

2. Description of Related Art

Optical fibers are very fragile. Use of such fibers in a environment which subjects them to stresses requires some form of reinforcement. Without reinforcement the stresses and environmental forces imposed on the fibers may result in breakage. More significantly, however, is the creation of microcracks and microbends in the optical fiber the quantity and severity of which are directly related to reduced quality of optical signals passing through the fiber.

The need for reinforced optical fibers is particularly significant where the fibers are subjected to substantial "G" loads, such as when they are used in or for communication with missiles or artillery projectiles. Applicant's copending application, Ser. No. 032,448, filed Mar. 31, 1987, now U.S. Pat. No. 4,770,370 discloses a particular use of optical fibers for communication with a tube launched projectile where the fibers are subjected to substantial stress during launch. After the projectile is launched, the fiber which streams from the projectile during its flight is not subjected to the same stresses. Accordingly, in such a use, only a predetermined length of the optical fiber needs to be reinforced. After the launch stress, regular optical fiber can be used. Because the optical fiber is preferably continuous, a method for reinforcing a predetermined length of a continuous fiber is required. Additionally, it is necessary to have a gradual transition between the reinforced fiber and the regular fiber to preclude a step in the fiber thickness. Such a step not only would provide a surface on which the fiber could snag, but also would constitute a fulcrum about which the fiber could bend thereby concentrating flexing stresses at one point.

The subject invention provides a method of manufacturing a optical fiber having a strong but moderately flexible reinforcing coating which will protect the fiber from a hostile environment and from stress imposed on it and from wear and abrasion. The method of the invention also produces optical fiber which may be reinforced for a predetermined length after which the reinforcing coating is gradually reduced to nothing.

Other objects nd advantages will be set forth in part in the description which follows, and in part will be apparent from the description, or may be learned from practice of the invention. The objects and advantages of the invention may be realized and attained by means of the instrumentalities and combinations particularly pointed out in the appended claims.

SUMMARY OF THE INVENTION

In accordance with the purposes of the invention, as embodied and broadly described herein, the method of manufacturing reinforced optical fiber comprises conveying an elongated optical fiber from a source; symmetrically, coaxially winding reinforcing fibers to a selected density per unit length around the optical fiber; immersing the fiber-covered optical fiber in a resin bath for a predetermined time to form a flexible elastomeric polyurethane class of resin matrix among the wound reinforcing fibers; passing the resin-coated optical fiber through a sizing die to remove excess resin from and to shape the resin coating of the optical fiber; passing the optical fiber through an oven or ultraviolet radiant heater to cure the resin; coating the cured optical fiber with an external coating material; passing the fiber through a sizing die to shape and to remove excess external coating; and storing the reinforced optical fiber on a reel. For some applications only a single resin coating may be required.

The invention also includes the method of gradually reducing the thickness of the reinforcing coating after a predetermined length is obtained by gradually reducing the thickness of the external coating applied to the reinforced optical fiber until no external coating is applied and then gradually reducing the reinforcing fiber density per unit length to zero while simultaneously reducing the amount of resin applied to the optical fiber to zero.

The invention resides in the novel parts, constructions, arrangements, combinations and improvements shown and described. The accompanying drawings, which are incorporated in and constitute a part of this specification, illustrate the presently preferred embodiment of the invention and, together with the description, serve to explain the principles of the invention.

BRIEF DESCRIPTION OF THE DRAWINGS

FIG. 1 is a graphic representation of the process of the invention.

FIG. 2 is a cross sectional view of the reinforced optical fiber taken along line II—II of FIG. 1.

FIG. 3 is a side cross sectional view of a optical fiber manufactured using the invention at the transition between the reinforced and non-reinforced optical fiber.

DESCRIPTION OF THE PREFERRED EMBODIMENT

Reference will now be made in detail to the present preferred embodiment of the invention, an example of which is illustrated in the accompanying drawings.

In accordance with the invention, the method of manufacturing reinforced optical fiber comprises conveying an elongated optical fiber from a source. As illustrated in FIG. 1, optical fiber 10 is preferably stored on reel 12 and axially conveyed from the reel at a predetermined, generally constant rate. Single or multimode or multiple standards of optical fibers may be reinforced using the method of the invention. The method of conveying fiber from a reel is known. The rate of conveying the fiber, of necessity, will be chosen to permit adequate treatment of the fiber at subsequent processing steps.

The method of the invention further comprises the step of symmetrically, coaxially winding reinforcing fiber to a selected density per unit length around the optical fiber. As depicted in FIG. 1, multiple spools 14 of reinforcing fiber are mounted on a rotating head 16 disposed for coaxial rotation around optical fiber 10 downstream of reel 12. The device braids the reinforcing fiber on to the optical fiber. The preferred device for winding the reinforcing fiber 18 around optical fiber 10 is a rope walk as used in the maritime industry to make rope. This is well known in the art. The reinforcing fiber is preferably Kevlar to provide a high strength to weight ratio to the finished fiber and still provide some flexibility to the finished process. Kevlar is a DuPont trademark for an aromatic polyamide fiber. Fiberglass fiber or other similar high-strength, flexible fiber may be used.

The rate of rotation of head 16 will depend on the number of separate reinforcing fibers being wound or woven around optical fiber 10 and on the rate at which optical fiber 10 is conveyed through head 16. Of course, the rate at which reinforcing fiber 18 is wound will also depend on the desired density of reinforcing fiber per unit length of optical fiber. As depicted in FIG. 2, reinforcing fiber 18 is woven around optical fiber 10 to a diameter substantially greater than the clad optical fiber. The density of reinforcing fiber may vary depending on the level of reinforcement for and the required flexibility of the optical fiber required in the environment of its intended use. For use in the tube-launched projectile referred to above, Kevlar fiber is preferably wound to a strength level of 200 psi or greater.

The method of the invention further includes the step of immersing the reinforcing fiber-covered optical fiber in an resin bath for a predetermined time to form a flexible resin matrix among the wound reinforcing fibers. As embodied herein, reinforcing optical fiber 20 is immersed in a resin bath 22 having a predetermined depth and length chosen to permit a fiber residence time in the bath necessary for the resin to fully fill the spaces between the wound reinforcing fibers. As depicted in FIG. 2, resin 24 forms a matrix in which reinforcing fiber 18 is uniformly dispersed. The preferred resin will depend on the ultimate use of the reinforced optical fiber, although the selected resin should retain a degree of flexibilty after curing. Resin chosen from the elastomeric polyurethane class of materials have been found to be satisfactory. The temperature of the resin bath will depend on the resin chosen but should be such that the resin is sufficiently liquid to permit full formation of the resin matrix 24.

Variation of the density of reinforcing fiber on the optical fiber will require variation in the amount of resin applied to the reinforced optical fiber. To achieve variable resin application without varying fiber feed speed, the resin bath preferably includes means for selectively varying the amount of resin applied. As depicted in FIG. 1, fiber 20 is conveyed around rollers 26 immersed in bath 22. Varying the depth of immersion in bath 22 of rollers 26 will vary the exposure of fiber 20 to the resin. Alternatively, varying the depth of the resin can also be used to change the resin coating although varying the roller depth is preferred as providing more responsive change of and greater available variation in the resin coating. It is recognized that variations may be achieved by varying the feed speed of fiber 10 and this technique may be used but is not the preferred embodiment.

The invention further includes the step of passing the resin-coated fiber through a sizing die to remove excess resin from and to shape the resin coating of the fiber. In the preferred embodiment, resin-coated fiber 28 passes through sizing die 30. The opening of sizing die 30 is selected with consideration for the diameter of the reinforcing fiber coating. Preferably, the opening of die 30 is variable to permit variation or gradual reduction of the thickness of the reinforcing coating. The presently preferred die is sapphire presently manufactured by General Ruby and Sapphire Corporation, Tampa, Fla.

Die 30 normally will have a circular opening, however for some uses of the reinforced optical fiber a cross sectional shape other than circular may be desired.

The method further includes passing the fiber through an oven for curing the resin. As depicted in FIG. 1, sized fiber 32 is conveyed through a conventional ultraviolet oven 34 for a time selected to cure the chosen resin.

After curing, the invention includes coating the cured fiber with an external protective coating material which may be an acrylate or an elastomeric polyurethane. Bath 36 is disposed downstream of oven 34 and contains a predetermined depth of the selected coating material. Cured fiber 38 preferably is immersed in bath 36 for a predetermined time to obtain a coating 40 over the cured reinforcing fiber/resin matrix. The coating serves to protect the reinforcing coating from abrasion, acids and other environmental agents and serves to keep the woven reinforcing fibers from unravelling on the surface. Beyond these purposes, the coating material may be chosen to protect the optical fiber from deterioration or interference.

Other means for coating the fiber with an exterior coating may be used. Whatever means is used, however, preferably permits selective variation of the depth of the coating and permits gradual reduction of the coating to zero. The second bath can be eliminated if desired. The presently preferred means for varing the coating depth is to vary the depth of immersion of the fiber 38 in bath 36 by varying the depth of guide rollers 42 or varying the depth of the coating bath. Both methods are essentially the same as discussed above with respect to bath 22.

The invention further comprises passing the fiber through a second sizing die to shape and to remove excess external coating. Die 44 is disposed downstream of external coating bath 36 and functions in a manner similar to die 30. Die 34 also is preferably variable and may have different cross-sectional shapes for its opening.

Depending on the external coating used, it may be preferred to pass fiber 46 after having been sized in die 44 through an oven 48 to cure the external coating. Any conventional oven, either thermal or ultraviolet, may be chosen which serves to cure the selected external coating.

After sizing, and curing if necessary, reinforced fiber 50 is stored on a reel 52.

While the invention may be used for reinforcing optical fiber of any length, the invention particularly contemplates reinforcing a predetermined length of a continuous elongated optical fiber. Thus, the method includes the step of gradually reducing the thickness of the reinforcing coating after the predetermined length is obtained by gradually reducing the thickness of the external coating applied to the fiber until no external coating is applied and then gradually reducing the reinforcing fiber density per unit length to zero while simultaneously reducing the amount of resin applied to the fiber to zero.

As discussed above, where an optical fiber is only reinforced through part of its length, the transition from reinforced to non-reinforced must be gradual. As depicted in FIG. 3, reinforcing coating 54 is gradually reduced through transition 56 to the point where non-reinforced or regular optical fiber 10 continues. This transition is achieved by first gradually reducing the external coating 40 and then gradually reducing the reinforcing fiber coating 58. These reductions are acheived by first reducing exposure of fiber 38 to external coating bath 36 and reducing the opening of die 44. Thereafter, the density per unit length of reinforcing fiber 18 applied to optical fiber 10 is gradually reduced while exposure of fiber 20 to the resin bath 22 and the opening of die 30 are reduced. The length of transition 56 will depend on the thickness of the reinforcing coating 54 and can be varied by selective variation of the elements of the process discussed above.

The invention provides a method for selectively reinforcing optical fiber. It will be apparent to those skilled in the art that various modifications and variations could be made in the method of the invention without departing from the scope or spirit of the invention.

What is claimed is:

1. A method of manufacturing reinforced optical fiber comprising the steps of:
    conveying an elongated optical fiber from a source;
    symmetrically, coaxially winding reinforcing fiber to a selected density per unit length around said optical fiber to form a reinforcing-fiber covered optical fiber;
    immersing said reinforcing-fiber covered optical fiber in an resin bath for a predetermined time to form a flexible resin matrix among said wound reinforcing fibers to form a resin-coated optical fiber;
    passing said resin-coated optical fiber through a first sizing die to remove excess resin from and to shape the resin coating of said optical fiber to form a shaped resin-coated optical fiber;
    passing said shaped resin-coated optical fiber through an oven to cure said resin to form a cured resin-coated optical fiber;
    coating said cured resin-coated optical fiber with an external coating material to form a coated optical fiber;
    passing said coated optical fiber through a second sizing die to shape and to remove excess external coating to form a reinforced optical fiber; and
    storing said reinforced optical fiber on a reel.

2. A method of manufacturing optical fiber covered with a reinforcing coating for predetermined length thereof, the method comprising the steps of:
    conveying an elongated optical fiber from a source at a constant rate;
    symmetrically, coaxially wrapping reinforcing fiber around said optical fiber at a predetermined rate to achieve a predetermined reinforcing fiber density per unit length of reinforcing fiber-covered optical fiber;
    passing said reinforcing fiber-covered optical fiber over rollers immersed in a bath of resin having a predetermined depth to form a flexible resin matrix among the reinforcing fibers covering said optical fiber to form a resin-coated optical fiber;
    passing said resin-coated optical fiber through a first sizing die having a variable opening to remove excess resin from and to shape the resin coating of said optical fiber;
    passing said shaped resin-coated optical fiber through an oven to cure said resin;
    passing said cured resin-coated optical fiber over rollers immersed in a bath of external coating material having a predetermined depth for a predetermined immersion time, to form a coated optical fiber;
    passing said coated optical fiber through a second sizing die having a variable opening to remove external coating material in excess of a desired thickness and to shape the external coating to form an optical fiber with a reinforcing coating;
    placing said reinforced optical fiber on a take-up reel;
    gradually reducing the thickness of said reinforcing coating after said predetermined length is obtained by the steps of gradually reducing the thickness of said external coating applied to said fiber until no external coating is applied and then gradually reducing the reinforcing fiber density per unit length to zero while simultaneously reducing the amount of resin applied to said fiber to zero.

3. The method of claim 2 wherein the step of gradually reducing the thickness of said external coating comprises reducing the opening in said second sizing die at a predetermined rate and reducing the immersion time during which the fiber is in said external coating bath.

4. The method of claim 3 wherein the immersion time reducing step comprises lowering the depth of said external coating bath at a predetermined rate.

5. The method of claim 3 wherein the immersion time reducing step comprises reducing the depth of immersion of said rollers in said external coating bath at a predetermined rate.

6. The method of claim 2 wherein the step of reducing the reinforcing fiber density per unit length comprises reducing the rate at which said reinforcing fibers are wound around said optical fiber at a predetermined rate until no reinforcing fibers are wound around the optical fiber.

7. The method of claim 2 wherein the step of reducing the the amount of resin applied comprises reducing the opening in said first sizing die at a predetermined rate and reducing the immersion time during which the fiber is in said resin bath.

8. The method of claim 7 wherein the immersion time reducing step comprises lowering the depth of said resin bath at a predetermined rate.

9. The method of claim 7 wherein the immersion time reducing step comprises reducing the depth of immersion of said rollers in said resin bath at a predetermined rate.

10. A method of reinforcing a predetermined length of an elongated optical fiber comprising the steps of:
    axially conveying said elongated fiber from a source;
    symmetrically weaving strands of a reinforcing fiber to a selected density per unit length around said optical fiber;
    forming an resin matrix to a desired resin thickness among the strands of said woven reinforcing fiber;
    coating said resin matrix covered optical fiber with an external coating to a desired coating thickness; and
    after said predetermined length, sequentially gradually reducing the thickness of said external coating and gradually reducing the thickness of said resin matrix and the density of said reinforcing fiber to form a transition from reinforced fiber to non-reinforced fiber.

11. The method of claim 1, 2 or 10 wherein said reinforcing fiber is an aromatic polyamide.

12. The method of claim 1, 2 or 10 wherein said reinforcing fiber is fiberglass.

13. The method of claim 1, 2 or 10 wherein said external coating is an acrylate.

14. The method of claim 1, 2 or 10 wherein said external coating is an elastomeric polyurethane.

15. The method of claim 1, 2 or 10 wherein said resin is an elastomeric polyurethane.

16. A method of manufacturing an optical fiber reinforced in tensile and bending strength comprising the steps of:

conveying an elongated optical fiber from a source;

symmetrically, coaxially winding reinforcing fiber to a selected density per unit length around said optical fiber to form a reinforcing-fiber covered optical fiber;

immersing said reinforcing-fiber covered optical fiber in a resin bath for a predetermined time to form a flexible resin matrix among said wound reinforcing fibers to form a resin-coated optical fiber;

passing said resin-coated optical fiber through a first sizing die to remove excess resin from and to shape the resin coating of said optical fiber to form a shaped resin-coated optical fiber;

passing said shaped resin-coated optical fiber through an oven to cure said resin to form a cured resin-coated optical fiber;

coating said cured resin-coated optical fiber with an external coating material to form a coated optical fiber;

passing said coated optical fiber through a second sizing die to shape and to remove excess external coating to form a reinforced optical fiber; and storing said reinforced optical fiber on a reel.

* * * * *